M. J. GORMAN.
LICENSE INDICATOR FOR MOTOR VEHICLES.
APPLICATION FILED NOV. 3, 1920.
1,381,117.
Patented June 14, 1921.
2 SHEETS—SHEET 1.
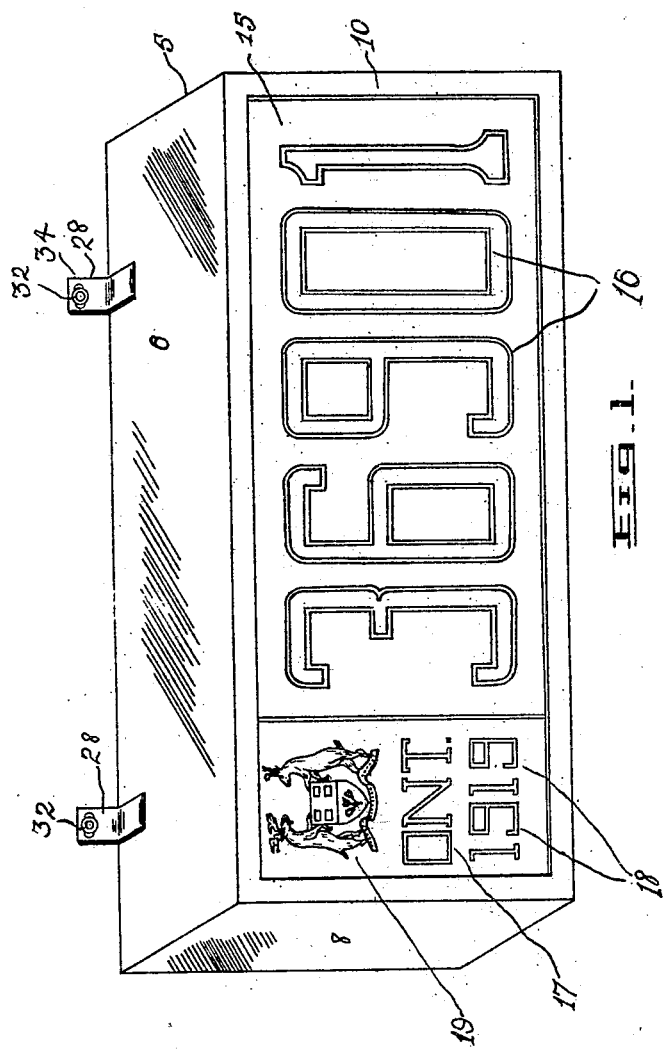
INVENTOR
Matthew J. Gorman
BY E. K. Bond
ATTORNEY M. J. GORMAN.
LICENSE INDICATOR FOR MOTOR VEHICLES.
APPLICATION FILED NOV. 3, 1920.
1,381,117.
Patented June 14, 1921.
2 SHEETS—SHEET 2.
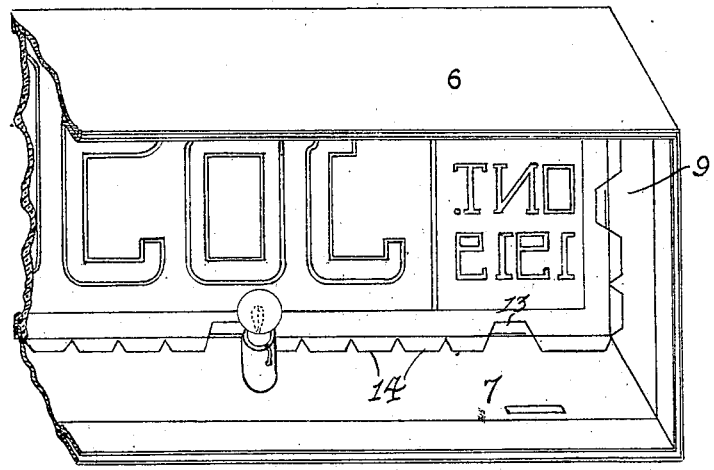
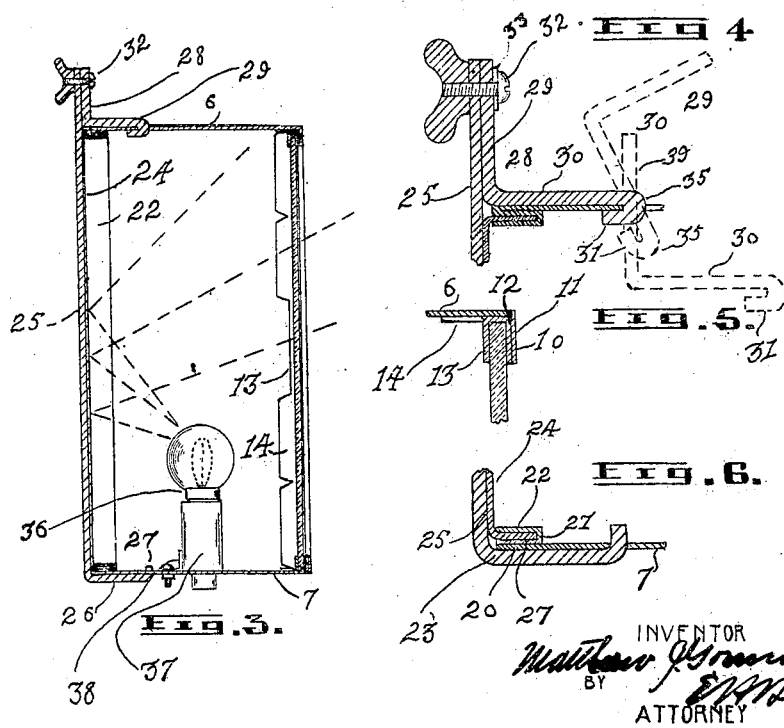

UNITED STATES PATENT OFFICE.

MATTHEW J. GORMAN, OF OTTAWA, ONTARIO, CANADA.

LICENSE-INDICATOR FOR MOTOR-VEHICLES.

1,381,117.  Specification of Letters Patent.  Patented June 14, 1921.

Application filed November 3, 1920. Serial No. 421,515.

*To all whom it may concern:*

Be it known that I, MATTHEW J. GORMAN, a citizen of the Dominion of Canada, residing at Ottawa, in the county of Carleton and Province of Ontario, Dominion of Canada, have invented certain new and useful Improvements in License-Indicators for Motor-Vehicles, of which the following is a specification.

The present invention relates to license indicators for motor vehicles and the principal object is to provide a device of the character described, which is adapted to display a plate bearing numerical characters indicating the license number of the vehicle and characters indicating the province or state in which the license was granted.

Another object is to provide an indicator, the casing of which is stamped out of sheet metal and having novel connecting means for its separate parts.

A further object is to provide for the novel attachment of the license and reflector plates to the casing proper whereby the use of solder as a connecting medium is obviated.

With these and other objects in view, the invention consists in the construction, combination and arrangements of parts as will be hereinafter fully described, illustrated in the accompanying drawings, and pointed out in the claims hereunto appended.

Figure 1 is a perspective view of the improved device, detached from the vehicle.

Fig. 2 is a fragmental perspective view with portions, broken away and in section and with the reflector plate and rear wall removed.

Fig. 3 is a transverse vertical section, illustrating the assembly and connection of the plates to the casing.

Fig. 4 is a magnified fragmental section of the connecting elements at the rear top part of the casing.

Fig. 5 is a similar view of the connecting elements at the front part of the casing, and Fig. 6 is a similar view of the connecting elements at the lower rear part of the casing.

Referring to the drawings like numerals designate like parts in the various drawings.

In the license indicators now in use, the various parts are soldered together and the plate bearing the character designations, is merely held by the crimped portions of the front plate of the casing, consequent of this construction, the license plate has the tendency to rattle and cause unnecessary noise. With the obviation of this defect in view, and to provide a device in which the principal parts are held in position without resorting to soldering, I have provided a casing 5 which is preferably stamped out of sheet metal. This casing 5 comprises the top, base and side walls 6, 7, 8 and 9. During the stamping operation one longitudinal marginal edge of the blank is bent over to form an inwardly directed flange 10 which surrounds the open front of the casing.

The metal at this point is bent over as at 11, and disposed flush with the inner surface of flange 10, then inwardly at right angles as at 12 and finally outwardly at different points to form the laps 13 which are spaced from and which extend in parallel plane to flange 10 and bent over portion 11. The metal forming a direct continuation of portion 12 forms the laps 14 which are disposed flush with the inner surfaces of walls 6, 7, 8 and 9. Resultant of this construction a continuous channel is formed between the bent over portions 11 and 13 of the plate ends and this channel is adapted for the reception of the edge portions of the license plate 15. Likewise the upper marginal edge of end plate 8 is crimped as at 11 over the edge portion of top wall 6 and serves to hold the casing ends together.

The license plate 15 is preferably constructed of glass and is securely held in upright position between the bent over portions 11 and laps 13 and its outer marginal edges will rest against the bent over portion 12. This plate may bear the numeral character designations 16 indicating the license number of the vehicle, characters indicating the place in which the license has been granted, the symbols 18 indicating the date of license grant and a symbolic designation 19 indicating the coat-of-arms of the province or State in which the license is granted. The back ground for the aforesaid designations will be of solid color, different from that of the said designations.

The rear marginal edges of casing walls 6, 7, 8, 9 and 10 are bent inwardly at 20 and over at 21 to dispose a portion 22 in spaced parallel relation to the portion 20, thereby forming a channel in which is inserted the flange portion 23 of the reflector plate 24, which latter closes the open rear end of the casing.

The upper and base walls 6 and 7 adjacent their opposite ends are provided with rectangular orifices. A back or closure plate 25 has its lower end bent at right angles as at 26 and the end portion is bent over to form the vertical flange 27 and projects through the orifice in the base 7 of the casing when the said back plate 25 is assembled thereon. The upper end of the back plate 25 extends upwardly beyond the top 6 of the casing and is provided adjacent its ends with circular openings.

For securing the upper end of the back plate 25 in position upon the casing, I provide the angle strap members 28, the vertical leg portions 29 of which are disposed substantially flush against the inner surface of the upper end of the back plate 25. These leg portions 29 of the angle members 28 are provided with openings, while the lower ends of the horizontal leg portions 30 of said members 28 are bent inwardly to form the flanges 31 which latter are spaced from the inner surface of the upper wall 6.

When the back plate 25 is in position the openings in its upper end, will register with the openings in the vertical leg portions 29 of angle members 28 and screw bolts 32 are inserted through the said openings and carry washers 33 and wing nuts 34. As the flanges 31 of the angle members 28 are disposed within the orifices in the upper casing walls 6 of the casing, the back plates 25 are held in snug relation with the leg portion 29 of the angle members 28 and the reflecting plate 24 will have its flange portions 23 tightly held in the channels formed by the overlapped portions 22 of the casing plate.

When the angle members 28 are assembled prior to attaching the same to the back plate 25, as illustrated diagrammatically in Fig. 4 the vertical leg portions 29 are first passed through the openings in the upper wall 6 of the casing, then the angle members are adjusted to position the horizontal leg portions 30 in register with the openings in the top wall 7, after which they are passed through the said openings, and turned toward the back plate 25. This operation causes the bent over portions 35 of legs 30 to partially project through the openings and the flanges 31 to engage the lower surface of the top wall 6 of the casing.

In this manner the back plate 25 snugly held against the rear end of the casing and the angle members 28 by their novel connection to the said casing always assume an upright position.

The reflecting plate 25 is preferably a highly polished sheet of metal which reflects the light from the incandescent lamps 36 mounted on the connecting posts 37, secured to the base 7 by a bracket 38. One or more of said lamps 36 may be employed for lighting the interior of the casing. The light rays will be reflected from plate 25 through the designations 16, 17, 18 and 19 on the license plate 15. This plate may be removed, if broken or for the introduction of a new plate by bending down the laps 13 from contact therewith.

From the foregoing it is thought that the construction of my invention will be clearly understood, and, therefore, a more extended explanation has been omitted.

What I claim as new is:

1. As a new article of manufacture, the herein described vehicle license indicator, comprising a casing formed with top, base and side walls, said walls having their edge portions bent over to form channels, a number bearing plate disposed in one of said channels, a closure plate detachably connected to the rear part of the casing, angle members secured to the bottom of the casing, angle members connected to said casing for holding the back plate in position thereon and means for connecting said angle members to said casing.

2. As a new article of manufacture, the herein described vehicle license indicator, comprising a casing, the front and rear edge portions of said casing being bent over to form channels, a transparent plate arranged in the channel at the forward part of the casing, said plate bearing character designations, a reflector plate arranged rearwardly of said casing, said plate formed with flanges, said flanges adapted for location within the other of said channels, a closure plate detachably connected at the rear of said casing, angle members secured to the bottom of the casing, angle members having their lower portion secured to said casing, the upper portions of said members extending parallel with the upper part of the closure plate and bolts passing through the upper part of the back plate and angle members, for detachably connecting the said plate to the casing.

3. As a new article of manufacture, a vehicle indicator, comprising a casing having top, base and side walls, the front edge portions of said walls being bent over to form a continuous channel and laps, the rear edge portions of said walls being bent over to form a channel, a transparent number plate disposed in the first mentioned channel, the said lap portions being bent upwardly for holding the said plate in position, a reflector plate disposed in the other of said channels, a closure plate arranged at the rear of said casing, said plate formed with a flange at its lower end, said base and top walls formed with openings, the lower wall opening adapted for the reception of the closure plate flange, angle plates having flanges disposed in the openings in the top wall of said casing and bolts adapted to pass through the angle plates and closure plate for detachably secured the latter to the casing.

In testimony whereof I affix my signature in the presence of two witnesses.

MATTHEW J. GORMAN.

Witnesses:
M. McMillan,
N. E. A. Budd.